United States Patent
Leymann et al.

(10) Patent No.: US 6,968,381 B2
(45) Date of Patent: Nov. 22, 2005

(54) METHOD FOR AVAILABILITY MONITORING VIA A SHARED DATABASE

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 09/682,046

(22) Filed: Jul. 13, 2001

(65) Prior Publication Data

US 2002/0059423 A1 May 16, 2002

(30) Foreign Application Priority Data

Jul. 15, 2000 (EP) .............................. 00115368

(51) Int. Cl.⁷ .............................................. G06F 15/16
(52) U.S. Cl. ....................... 709/226; 709/225; 709/226; 714/4
(58) Field of Search ................................ 709/223–226, 709/203, 204, 219, 231, 19; 714/1–4

(56) References Cited

U.S. PATENT DOCUMENTS

| | | | | |
|---|---|---|---|---|
| 5,777,989 A | * | 7/1998 | McGarvey | 370/254 |
| 5,828,847 A | | 10/1998 | Gehr et al. | 395/200.69 |
| 6,128,644 A | * | 10/2000 | Nozaki | 709/203 |
| 6,226,684 B1 | * | 5/2001 | Sung et al. | 709/238 |
| 6,256,670 B1 | * | 7/2001 | Davies | 709/224 |
| 6,259,705 B1 | * | 7/2001 | Takahashi et al. | 370/465 |
| 6,260,155 B1 | * | 7/2001 | Dellacona | 714/4 |
| 6,324,161 B1 | * | 11/2001 | Kirch | 370/217 |
| 6,370,656 B1 | * | 4/2002 | Olarig et al. | 714/23 |
| 6,532,494 B1 | * | 3/2003 | Frank et al. | 709/224 |
| 6,594,786 B1 | * | 7/2003 | Connelly et al. | 714/50 |

FOREIGN PATENT DOCUMENTS

| | | |
|---|---|---|
| JP | 07183891 | 7/1995 |
| JP | 08249281 | 9/1996 |
| JP | 10214208 | 8/1998 |
| JP | 2000047894 | 2/2000 |
| JP | 2000057095 | 2/2000 |

OTHER PUBLICATIONS

Sape Mullender, "Distributed Systems", ACM Press, Frontier Series, 1993, p. 349–351.

IBM Patent Application, "Leyman et al., Improved Availability In Clustered Application Servers", 1998.

* cited by examiner

Primary Examiner—Moustafa M. Meky
Assistant Examiner—Yasin Barqadle
(74) Attorney, Agent, or Firm—F. Chau & Associates, LLC (57) ABSTRACT

A technology for indicating and determining the availability of a multitude of application servers. The method comprises for each of application server a first step of inserting into an availability database a notification period defining an upper time limit for a repetition period of an availability signal, which is repeated as long as the application server is available. In a second step for each availability signal its corresponding time stamp is inserted as availability time into the availability database. The difference of the current time and a recent availability time compared to said notification period is representing a measure of availability for the application servers.

17 Claims, 6 Drawing Sheets

METHOD FOR AVAILABILITY MONITORING VIA A SHARED DATABASE

BACKGROUND OF INVENTION

The present invention relates to a method and means of indicating and determining the availability of a multitude of application servers providing application services to a multitude of application clients.

Enterprises depend on the availability of the systems supporting their day to day operation. A system is called available if it is up and running and is producing correct results. In a narrow sense availability of a system is the fraction of time it is available. MTBF denotes the mean time before failure of such a system, i.e. the average time a system is available before a failure occurs (this is the reliability of the system). MTTR denotes its mean time to repair, i.e. the average time it takes to repair the system after a failure (this is the downtime of the system because of the failure). Then, AVAIL=MTBF/(MTTR+MTBF) is the availability of the system. Ideally, the availability of a system is 1. Today, a system can claim high availability if its availability is about 99.999% (it is called fault tolerant if its availability is about 99.99% ). J. Gray and A. Reuter, "Transaction processing: Concepts and Techniques", San Mateo, Calif.: Morgan Kaufmann 1993 give further details on these aspects. Availability of a certain system or application has at least two aspects: in a first, narrow significance it relates to the question, whether a certain system is active at all providing its services; in a second, wider significance it relates to the question, whether this service is provided in a timely fashion offering a sufficient responsiveness.

One fundamental mechanism to improve availability is based on "redundancy":

The availability of hardware is improved by building clusters of machines and the availability of software is improved by running the same software in multiple address spaces.

With the advent of distributed systems, techniques have been invented which use two or more address spaces on different machines running the same software to improve availability (often called activereplication). Further details on these aspects may be found in S. Mullender, "Distributed Systems", ACM Press, 1993. In using two or more address spaces on the same machine running the same software which gets its request from a shared input queue the technique of warm backups is generalized by the hotpool technique.

C. R. Gehr et al., "Dynamic Server Switching for Maximum Server Availability and Load Balancing", U.S. Pat. No. 5,828,847, which is hereby incorporated herein by reference, teaches a dynamic server switching system related to the narrow significance of availability as defined above. The dynamic server switching system maintains a static and predefined list (a kind of profile) in each client which identifies the primary server for that client and the preferred communication method as well as a hierarchy of successively secondary servers and communication method pairs. In the event that the client does not have requests served by the designated primary server or the designated communication method, the system traverses the list to obtain the identity of the first available alternate server-communication method pair. This system enables a client to redirect requests from an unresponsive server to a predefined alternate server. In this manner, the system provides a reactive server switching for service availability.

In spite of improvements of availability in the narrow sense defined above this teaching suffers from several shortcomings. Gehr's teaching provides a reactive response only in case a primary server could not be reached at all. There are no proactive elements which already prevent that a client requests service from a non-responsive server. As the list of primary and alternate servers is statically predefined there may be situations in which no server could be found at all or in which a server is found not before several non-responsive alternate servers have been tested. In a highly dynamic, worldwide operating network situation where clients and servers permanently enter or leave the network and where the access pattern to the servers may change from one moment to the next, Gehr's teaching is not adequate.

The European Patent application EP 99109926.8 titled "Improved Availability in Clustered Application Servers" by the same inventors as the current invention is also related to the availability problem and any U.S. Patent based on this EP Application is hereby incorporated herein by reference. But this teaching is solely focused on the side of the application client. To make sure that a certain application request is being processed by an available application server it is suggested to send this application requests in a multicasting step to a multitude of application servers in parallel assuming that at least one available application server will receive this request. This teaching is completely mute on techniques of how to indicate availability of a certain application server.

From the same inventors a further European Patent application EP 99122914.7 titled "Improving Availability and Scalability in Clustered Application Servers" is known and any U.S. Patent based on this EP Application is hereby incorporated herein by reference. In this application the existence of a technique to determine availability of an application server is already assumed as a starting point. This teaching is then focusing on a technique of how an application client can perform workload balancing by selecting a certain application server to process an application request.

Despite the progress thus far, further improvements are urgently required supporting enterprises in increasing the availability of their applications and allowing for instance for electronic business on a 7 (days)*24 (hour) basis; due to the ubiquity of worldwide computer networks at any point in time somebody might have interest in accessing a certain application server.

The invention is based on the objective to provide an improved method and means for indicating availability of application servers to accept application requests and to provide an improved method and means for determining by an application client availability of an application server.

It is a further objective of the invention to increase the availability by providing a technology, which is highly responsive to dynamic changes of the availability of individual application servers within the network.

SUMMARY OF INVENTION

The objectives of the invention are solved by the independent claims. Further advantageous arrangements and embodiments of the invention are set forth in the respective subclaims.

The proposed method comprises for each of application server a first step of inserting into an availability database a notification period defining an upper time limit for a repetition period of an availability signal, which is repeated as long as the application server is available. In a second step for each availability signal its corresponding time stamp is inserted as availability time into the availability database. The difference of the current time and a recent availability time compared to said notification period is representing a measure of availability for the application servers.

DETAILED DESCRIPTION

The proposed technology increases the availability and scalability of a multitude of application servers providing services to a multitude of application clients. The current invention is providing a proactive technology as it prevents that an application client generates erroneous request routings requesting service from non-responsive servers. The dynamic technique with ongoing processing is highly responsive to dynamic network situation where clients and servers permanently enter or leave the network. Thus the invention can accommodate hot plug-in of server machines into application clusters, thus further increasing the scalability of the environment. Complicated administration efforts to associate application clients with application servers are complete avoided.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

If the current specification is referring to an application it may be a computer program of any nature not limited to any specific type or implementation. The terms application client and application server have to be understood from a logical point of view only relating to some type of "instance". These terms do not distinguish necessarily different address space or even different computer systems.

The current invention is assuming a certain communication path between application client and application server; this does not mean that the invention is limited to a certain communication paradigm.

Also if the current specification is referring to a "database" the term is to be understood in a wide sense comprising not only actual databases (like relational, hierarchical databases etc.) but also simple files and the like. In other words the term database refers to any type of persistent storage.

Enterprises depend on the availability of the systems supporting their day to day operation. A system is called available if it is up and running and is producing correct results. In a narrow sense the availability of a system is the fraction of time it is available. In a second, wider sense availability relates to the question, whether an application service is provided in a timely fashion offering a sufficient responsiveness.

Figure 1:
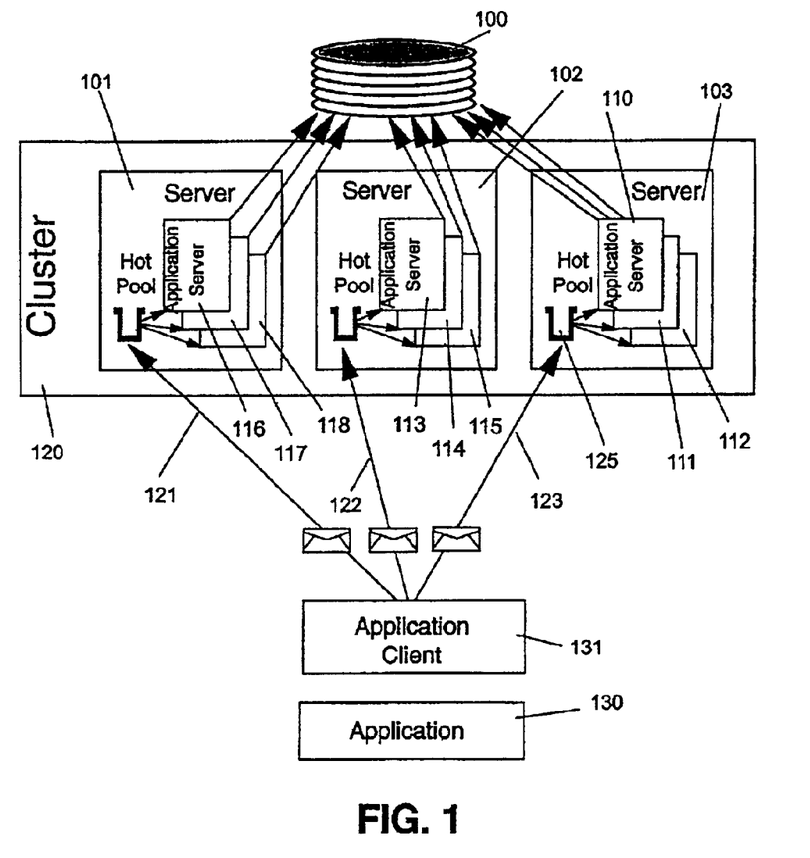
FIG. 1 is a diagram reflecting the concepts of an application server, a hot pool, an application cluster and an application client.

In the most preferable embodiment the current invention is relating to environments called "application cluster" based on the following concepts which are also depicted in FIG. 1:

An application server (110, 111 or 112) is an executable implementing a collection of related services—for instance including access to some shared remote database (100). A hotpool (110, 111, 112) is a collection of address spaces each of which runs the same application server and each of these application servers receive requests from an input queue (125), which is shared between the hot pool members. By a servermachine (101, 102 or 103) we mean a certain physical machine which hosts a hot pool of application servers. An applicationcluster (120) is a collection of servers which fail independently and each server hosts a hot pool of application servers of the same kind.

Applications (130) request services from application servers via application clients. An application client (131) is an executable which runs on the same machine as the application and which communicates with a server on behalf of the application. If the communication between the application client and a server is based on (asynchronous) reliable message exchange, the application server is said to be message based. In what follows we do assume message based communication between application clients and application servers; of course the invention is not limited to the message based communication paradigm as other paradigms may be used instead. Consequently, an application client requests the performance of a certain service by sending a corresponding message into the input queue of a hot pool of associated application servers on a particular machine.

A client can protect itself against server failures and thus increasing the availability of the overall environment by simply multi-casting its requests as already described above in conjunction with the European Patent Application EP 99109926.8. But this requires a special implementation of the application servers or it is restricted to idempotent requests. Furthermore, it increases the number of messages sent by factors! If the number of messages is a problem, each client that sends requests to a hot pool has to detect that this hot pool has failed (which is easy: the corresponding PUT command will be negatively acknowledged to the client by the messaging middleware!). When the client would know other hot pools of the same application server (i.e. server machines of the application cluster the failing hot pool is a member of) it could send its requests to another hot pool on a different server of the cluster. In doing so, clients could implement takeover between hot pools themselves.

Therefore the problem is to detect servers that are still available for accepting requests (so-called availability monitoring). For that purpose a so-called watchdog can be used to monitor a hot pool on a single machine to detect failed servers. In addition, a watchdog will automatically restart failed application servers of the hot pool it monitors. In conjunction with the European Patent Application EP 99122914.7 as described above the concept of watchdog monitoring has been discussed to detect failed server machines in application clusters. This concept is based on a specific communication protocols between the watchdogs to monitor and to determine the set of available application servers. Typically, messages are sent via the network between parts of a distributed application to maintain the overall state of its components. Considering the collection of watchdogs to be monitored as such a distributed application (the sole purpose of which would be to respond to inquiries about the liveliness of its distributed components) such a network-based message passing scheme can be used. But network-based message passing protocols have a couple of inherent problems (more or less severe), for example, 1. the simple fact, that messages are to be sent will put additional load on the network which is not tolerable in some situations;

2. more complex algorithms have to be implemented to avoid single points of failures (like in "centralized" monitoring where a distinguished watchdog simply observes the others as participants) which results in a more development efforts; moreover such implementations raise the problem of "check the checker", i.e. specific programming techniques have to be exploited to make sure that these checking instances themselves do not create any failure.

3. reachability properties must be ensured (e.g. the central watchdog must be able to reach all others in "centralized monitoring", or each watchdog must be able to reach all others in "distributed monitoring") which is both, a hard to achieve administrative task in setting up the environment appropriately, and difficult to cope with in case of network partitioning (i.e. due to connection losses the network dissociates into disjunct sub-nets) that can occur and must be handled.

As a consequence, the objective of the current invention is to overcome such mechanisms that require these extensive network based message passing protocols. But at the same time the desired solution to these problems should provide a proactive technology which automatically determines application servers entering (hot plug-in) or leaving the cluster.

Figure 2:
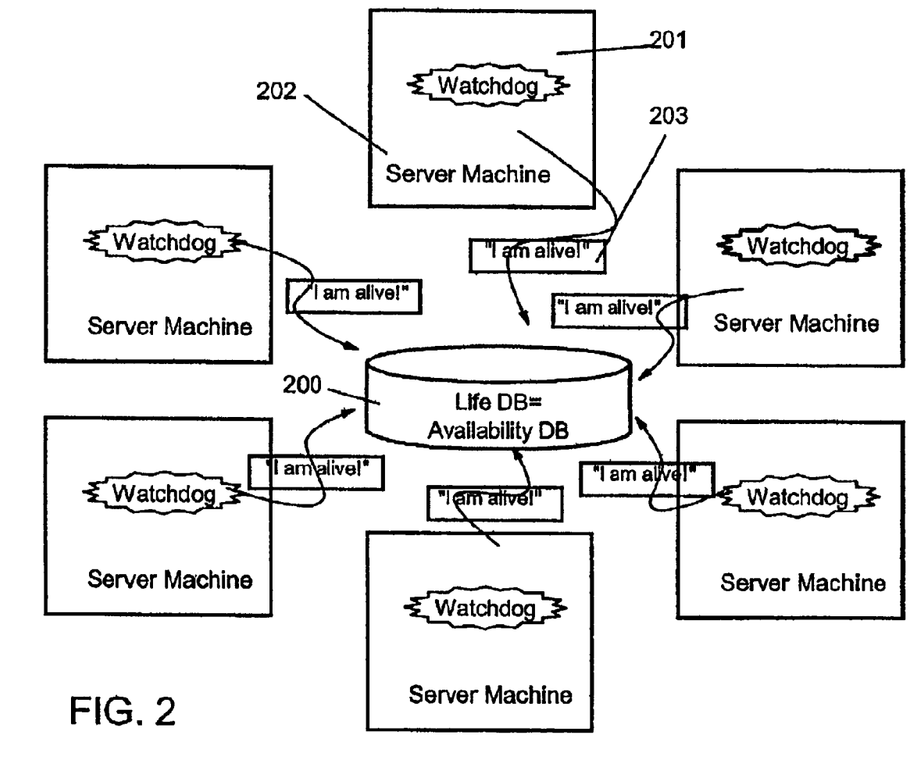
FIG. 2 reflects the suggested availability database according to the current invention, which is maintained by each application server/corresponding watchdog as a communication medium for indicating its availability status.

The central idea of the current invention is reflected in FIG. 2. The central observation of the current invention is, that introduction of a central and shared database would reduce the network message traffic issue mentioned above significantly. It is suggested to use a database shared by all watchdogs to be monitored as the communication medium for exchanging state about liveliness of application servers. This new database is referred to as lifedatabase or availabilitydatabase 200. In the preferred embodiment of the invention periodically each watchdog 201 of the corresponding application servers of the cluster 202 writes an "I am alive!" 203 record into the life database; this record is to be understood as an availabilitysignal of the corresponding application servers to indicate their readiness to accept application service requests. The introduction of the watchdog concept is already an additional improvement; of course it would be possible that each application server itself is responsible to insert the availability signal into the availability database.

As a sample embodiment a relational database system hosting the live database of an application cluster is assumed. Note, that this is not central to the current invention, i.e. any other persistent store (e.g. a file system or an enterprise Java beans entity container) can be used for this. Especially, the topology database that an application cluster might use for its systems management could be extended via appropriate tables representing the life database.

Any software (for instance application clients interested in requesting application services) that can access the life database of an application cluster can determine the servers that are available and the ones that have failed and are currently not available.

It is not sufficient, that for a certain application server or its watchdog a corresponding availability signal would be entered into the availability database just once. If after this event the application server would crash, the availability database would run out of sync with the current situation. To cope with this problem the current invention suggests for this purpose, that the life database must also contain information about the period each watchdog agreed to write "I am alive!" records into the database. Therefore a further data element is to be inserted into the availability database comprising a notification period; the notification period defines an upper time limit during which the availability signal is repeated as long as the corresponding watchdog (or application server) is available.

Figure 3:
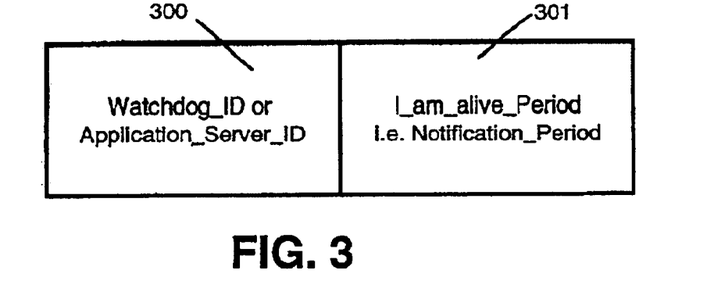
FIG. 3 shows the record format of the period table according to the current invention comprising the individual notification periods.

As a sample embodiment FIG. 3 shows the period table to store the individual notification periods. It is suggested that the period table comprises an identification of the watchdog (representing the application cluster) or an identification of the application server 300 which repeats the availability signal as well as the notification period 301. Each watchdog/application server participating in the availability monitoring would enter such an record into the availability database. It is obvious to every average expert of this technical field how to derive via SQL the period with that a watchdog writes "I am alive!" messages from that table. Also, all watchdogs encompassed by the application cluster can be derived from that table via SQL.

Figure 4:
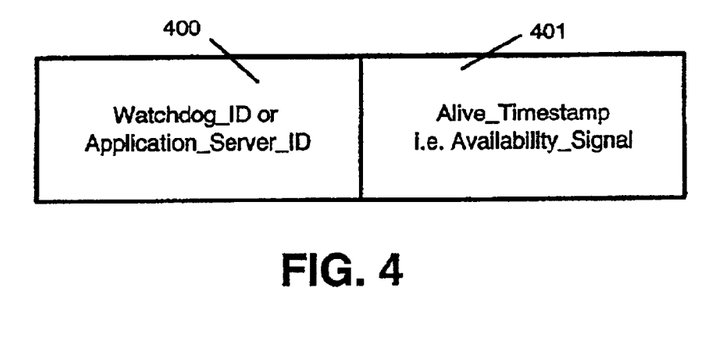
FIG. 4 visualizes the record format within the availability database to store the individual availability signals.

As a sample embodiment, FIG. 4 depicts the table Alive_Signal that is used to represent an "I am alive!" record of a watchdog; that is, for each availability signal received from a watchdog such a record would be entered into the availability database. Similar to the period table, it is suggested that the Alive_Signal table comprises identifications 400 of the corresponding watchdog/application server which sent the availability signal. Moreover the Alive_Timestamp field 401 stores the time stamp and therefore the availability time of the most recent availability signal.

The information contained in these two tables, the period table and the Alive_Signal table, reflect a precise picture of the availability of the application servers.

In general terms for each application server an availability measure is defined by the difference of the current time (for instance the time when querying the availability database) and the most recent availability time in comparison with the notification period of that particular application server. Even more generally a second difference between the current availability time and the previous availability time can be added to the availability measure. The following specific availability measures have been proven to be successful:

1. If the difference of the current time and the most recent availability time exceeds the notification period, the corresponding application server is treated as unavailable; this is because the application server "promised" to repeat availability signals at least within the notification period. Otherwise the application server is regarded as available.

2. From the Alive_Signal table, the time passed between the insertions of the last two "I am alive!" records written by a particular watchdog can be determined; i.e. the time difference between the most recent availability time and the previous availability time is determined. If that duration exceeds the notification period this watchdog agreed to insert "I am alive!" messages, the watchdog is a candidate to have failed. This availability measure is based on the assumption that, if the last two availability signals are not within the expected notification period, this is a indication that the application server currently is experiencing problems and therefore it should be avoided.

3. Typically, such a timeout based failure determination mechanism must cope with situations like that a watchdog is simply too busy to write an availability signal into the availability database but is still available. An availability measure being able to cope with such a situation is achieved by treating an application server as unavailable, if the difference between the current time and the previous availability time exceeds the notification period by a factor of N.

However, based on the availability database (life database) it can be determined which watchdog/application server has failed and which watchdog/application server is still available. Especially, every program having access to the life database can perform this check: each watchdog, a separate administration component that might be build for this environment and of course each application client looking for an available application server for passing over an application service request. Each application client can query the availability database making use of above availability measures to determine at least one available application server to which it then sends an application service request.

A further advantageous embodiment of the current invention can be achieved if the watchdogs or application servers dynamically adjust their notification period. If this dynamic adjustment depends on the amount of workload to be processed by an application server, the availability measure becomes a new quality by also representing a workload indication. By increasing the notification period, if the amount of workload increases, and by decreasing the notification period, if the amount of workload decreases, the notification period represents (at the same time) an workload indicator expressing the responsiveness of an application server. This indication can be exploited by an application client by determining the availability measure for a set of application servers in parallel. In this situation the availability measure can be used not only for determining the subset of available application servers (which would represent a binary decision only: "available" versus "unavailable") but it also can form a basis for workload balancing decision executed by the application client. The numerical value of the availability measure, more or less influenced by the current notification period as a parameter, is then also a workload indication. An application client would then issue its application service request to that available application server with the lowest workload, i.e. the application server with the largest availability measure with respect to this further application request.

Figure 5:
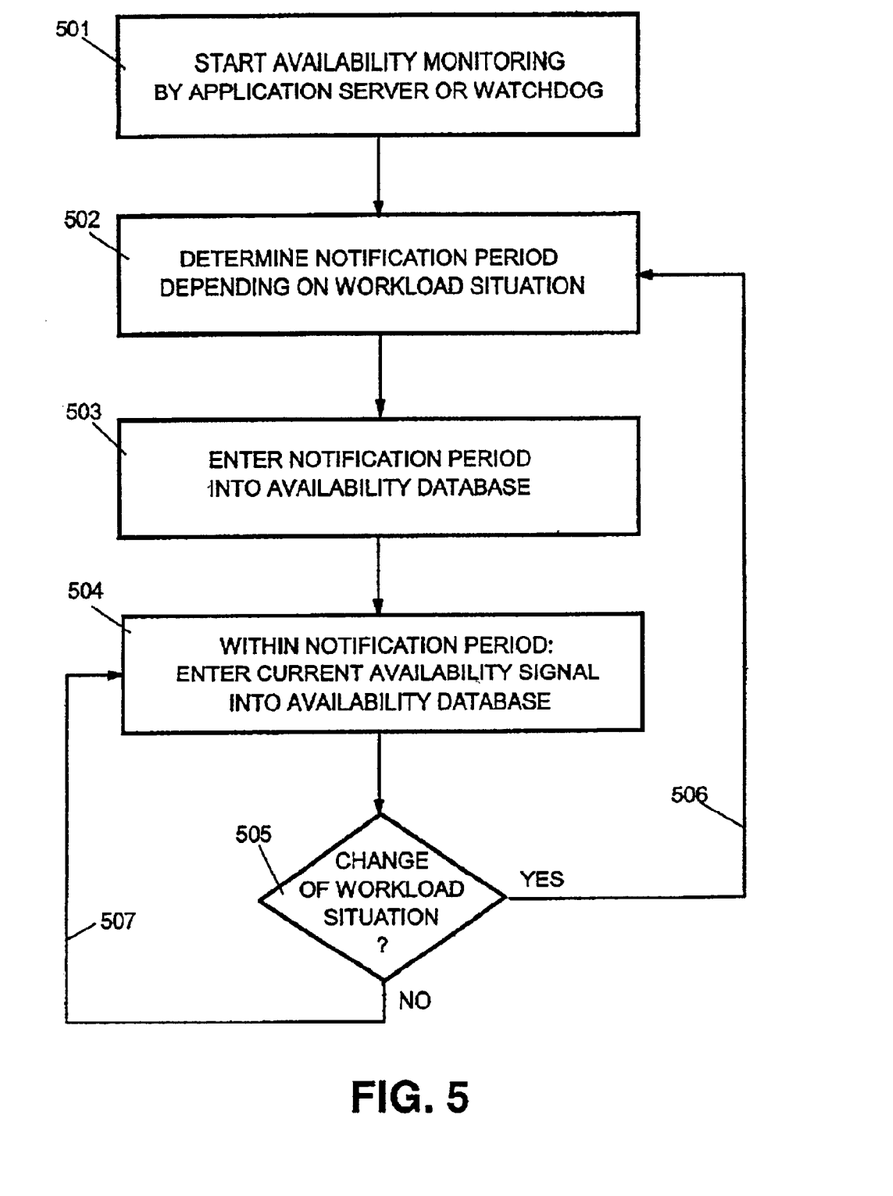
FIG. 5 reflects a flow diagram depicting the method and computer program product for indicating availability according to the current invention also including the dynamic aspect of adapting the notification period depending on the workload situation.

FIG. 5 reflects a flow diagram depicting the method for indicating availability also including the dynamic aspect of adapting the notification period depending on the workload situation. The process of availability monitoring by an application server or watchdog is started within step 501. Within the next step 502 the current workload situation is determined to calculate the notification period, which is not too high or too low compared to the current workload situation. This calculated notification period has to be entered (of course) into the availability database within step 503. Within the time frame set by the notification period the current availability signal has to be entered into the availability database; this is reflected in step 504. The notification period defines an upper time limit for repetition of the availability signal; depending on the workload the application server/watchdog will try to issue and availability signal more frequently. After step 504 (or as an alternative embodiment before this step) the current workload situation is analyzed within step 505. If the current workload situation changed in a way, which requires to re-adjust the notification period, the process step of determining the notification period is started again choosing the control path 506. If the current workload situation didn't change significantly, repetition of issuing an availability signal is repeated choosing path 507.

The structure and layout of the availability database with its period table (depicted in FIG. 3), it's availability table (depicted in FIG. 4) has to be understood from an expanded perspective only. Of course the structure of the availability database may be subject of further improvements like the following:

1. Each insertion of a new notification period, or a new availability signal would introduce a new record into the database. To prevent that the availability database would permanently increase, processes are suggested, which remove old database records, which are of no use any more; for instance, with respect to each record type of a certain watchdog/application server only the most current and the previous record are maintained within the database. For the implementation of such a process the technology of "Stored Procedures" could be exploited advantageously; such an adapted stored procedure could run in the database in the background to delete records no longer required.

Figure 6:
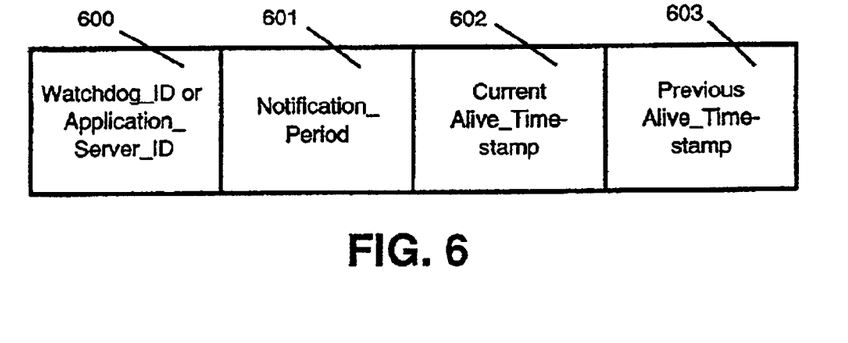
FIG. 6 shows an example of an implementation combining the period table and the availability signal table into a single table only.

2. It is of course not essential to the current invention to store the notification period and the availability signal in different database records. An example how to include both data elements within one database record is visualized in FIG. 6. As can be seen from FIG. 6, besides the watchdog identification/application server identification 600 and the notification period 601, the multitude of availability signals is reduced to two entries only. Whenever the current availability signal 602 is updated by a new availability signal its contents is transferred into the field storing the previous availability signal 603; after that, the new availability signal is inserted into the field of the current availability signal 602. With this technique the availability database is limited to a moderate size as for each watchdog/application server a single database record has to be maintained only.

The proposed technology increases the availability and scalability of a multitude of application servers providing services to a multitude of application clients. The current invention is providing a proactive technology as it prevents that a client generates erroneous request routings requesting service from non-responsive servers. An ongoing process is suggested being highly responsive to dynamic network situation where clients and servers permanently enter or leave the network. Thus the invention can accommodate hot plug-in of server machines into application clusters further increasing the scalability of the environment. Complicated or due its sheer complexity impossible administration efforts to associate application clients with application servers are complete avoided.

As the current invention does not assume any network-based message passing, all disadvantages of such mechanisms (refer to the remarks above) are avoided. The only system prerequisite is a shared database. Today's database management systems are extremely robust such that one doesn't have to consider the life database as a single point of failure. Furthermore, most application servers are built on top of a database system. Thus, the assumption of a shared database is automatically fulfilled in many situations. Reachability is not a problem at all because each server machine by hosting a hot pool has access to the shared database. Finally, the watchdog monitoring technique can be easily implemented via SQL when putting the life database into a relational DBMS.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. A computerized method for indicating availability of one or a multitude of application-servers, comprising:
    said method comprising a first step of inserting into a central availability-database a first-data-element comprising a notification-period, said notification-period defining an upper time limit for a repetition period of an availability-signal being repeated as long as said application-server is available;
    said method comprising a second step of inserting into said central availability-database a second-data-element comprising for each availability-signal its corresponding time stamp as availability-time;
    whereby, the difference of the current-time and a recent availability-time compared to said notification-period is representing a measure of availability of said application-server; and
    said method comprising a third step of updating said notification-period depending on the amount of workload of said application-server
        either by increasing said notification-period, if said amount of the workload increases,
        or by decreasing said notification-period, if said amount of the workload decreases.

2. A computerized method for indicating availability according to claim 1, comprising:
    wherein within said first and said second step also an application-server-identification is inserted into said central availability-database and associated with said first- and said second-data-element.

3. A computerized method for indicating availability according to claim 2, comoprising:
    wherein said measure of availability indicates unavailability of said application-server, if said difference exceeds said notification-period.

4. A computerized method for indicating availability according to claim 1, comprising:
    wherein said central availability-database is shared by a multitude of application-servers each comprising a hot-pool of said one or multitude of application-servers;
    wherein for said hot-pool a watchdog is monitoring said hot-pool's availability status;
    wherein said method is being executed by said watchdog;
    wherein said availability-signal is being repeated as long as at least one of said application-servers of said hot-pool is available; and
    wherein within said first and said second step also a hot-pool-identification is inserted into said central availability-database and is associated with said first- and said second-data-element.

5. A computerized method for indicating availability according to claim 1, comprising:
    whereby as a second difference the difference of said recent availability-time and a previous availability-time is included in said measure of availability.

6. A computerized method for indicating availability according to claim 4, comprising:
    whereby as a second difference the difference of said recent availability-time and a previous availability-time is included in said measure of availability.

7. A computerized method for determining availability of one or multitude of application-servers for accepting application-service-request, comprising:
    said method comprising a first step of querying a central availability-database
        for a first-data-element comprising a notification-period, said notification-period defining an upper time limit for a repetition-period of an availability-signal being repeated as long as said application-server is available;
        for a second-data-element comprising for a recent availability-signal its time-stamp as recent availability-time;
    said method comprising a second step of determining a measure of availability of said application-server by comparing the difference of the current-time and said recent availability-time to said notification-period;
    said method comprising a third step of issuing an application-service-request to said application-server only, if said measure of availability indicates availability of said application-server; and
    said method comprising a fourth step of updating said notification-period depending on the amount of workload of said application-server
        either by increasing said notification-period, if said amount of the workload increases,
        or by decreasing said notification-period, if said amount of the workload decreases.

8. A computerized method for determining availability according to claim 7, comprising:
    wherein said method is querying in said first step also for a third-data-element comprising a previous availability-time for a previous availability-signal; and
    wherein in said second step also as a second difference the difference of said recent availability-time and said previous availability-time is included in said measure of availability.

9. A computerized method for determining availability according to claim 7, comprising:
wherein said measure of availability indicates unavailability of said application-server, if said difference exceeds said notification-period by a factor of N.

10. A computerized method for determining availability according to claim 8, comprising:
wherein said method is being executed for a multitude of application-servers;
wherein in said third step
a subset of application-servers, comprising application-servers for which said measure of availability indicates availability, is determined, and
for each application-server within said subset its corresponding measure of availability is interpreted as a workload indications; and
said application-service-request is being issued to an application-server with the lowest workload.

11. A system indicating availability of one or a multitude of application-servers, said system comprising:
a first device for inserting into a central availability-database a first-data-element comprising a notification-period, said notification-period defining an upper time limit for a repetition period of an availability-signal being repeated as long as said application-server is available;
said device further inserts into said central availability-database a second-data-element comprising for each availability-signal its corresponding time stamp as availability-time;
whereby, the difference of the current-time and a recent availability-time compared to said notification-period is representing a measure of availability of said application-server; and
said device updates the notification-period depending on the amount of workload of said application-server
either by increasing said notification-period, if said amount of the workload increases,
or by decreasing said notification-period, if said amount of the workload decreases.

12. A data processing program for execution in a data processing system comprising software code portions, said software code portions comprising:
a first software code portion for inserting into a central availability-database a first-data-element comprising a notification-period, said notification-period defining an upper time limit for a repetition period of an availability-signal being repeated as long as an application-server is available;
a second software code portion for inserting into said central availability-database a second-data-element comprising for each availability-signal its corresponding time stamp as availability-time;
whereby, the difference of the current-time and a recent availability-time compared to said notification-period is representing a measure of availability of said application-server; and
a third software portion for updating said notification-period depending on the amount of workload of said application-server
either by increasing said notification-period, if said amount of the workload increases,
or by decreasing said notification-period, if said amount of the workload decreases.

13. A computer program product stored on a computer usable medium, comprising a computer readable program embodied in said medium, comprising:
readable code for inserting into a central availability-database a first-data-element comprising a notification-period, said notification-period defining an upper time limit for a repetition period of an availability-signal being repeated as long as an application-server is available, and;
readable code for inserting into said availability-database a second-data-element comprising for each availability-signal its corresponding time stamp as availability-time,
whereby, the difference of the current-time and a recent availability-time compared to said notification-period is representing a measure of availability of said application-server; and
readable code for undating said notification-period depending on the amount of workload of said application-server
either by increasing said notification-period, if said amount of the workload increases,
or by decreasing said notification-period, if said amount of the workload decreases.

14. A system for determining availability of one or multitude of application-servers for accepting application-service-request, said system comprising:
a first device for querying a central availability-database
for a first-data-element comprising a notification-period, said notification-period defining an upper time limit for a repetition-period of an availability-signal being repeated as long as said application-server is available, and
for a second-data-element comprising for a recent availability-signal its time-stamp as recent availability-time;
said device determines a measure of availability of said application-server by comparing the difference of the current-time and said recent availability-time to said notification-period;
wherein said device issues an application-service-request to said application-server only, if said measure of availability indicates availability of said application-server; and
said device updates the notification-period depending on the amount of workload of said application-server
either by increasing said notification-period, if said amount of the workload increases,
or by decreasing said notification-period, if said amount of the workload decreases.

15. A data processing program for execution in a data processing system comprising software code portions, said software code portions comprising:
a first software code portion for querying a central availability-database
for a first-data-element comprising a notification-period, said notification-period defining an upper time limit for a repetition-period of an availability-signal being repeated as long as said application-server is available, and
for a second-data-element comprising for a recent availability-signal its time-stamp as recent availability-time;
a second software code portion to determine a measure of availability of said application-servers by comparing the difference of the current-time and said recent availability-time to said notification-period;

a third software code portion to issue an application-service-request to said application-server only, if said measure of availability indicates availability of said application-server; and a fourth software code portion for updating said notification-period depending on the amount of workload of said application-server
either by increasing said notification-period., if said amount of the workload increases,
or by decreasing said notification-period, if said amount of the workload decreases.

16. A computer program product stored on a computer usable medium, comprising a computer readable program embodied in said medium comprising:

readable code for querying a central availability-database
for a first-data-element comprising a notification-period, said notification-period defining an upper time limit for a repetition-period of an availability-signal being repeated as long as said application-server is available, and
for a second-data-element comprising for a recent availability-signal its time-stamp as recent availability-time;

readable code for determining a measure of availability of said application-server by comparing the difference of the current-time and said recent availability-time to said notification-period;

readable code for issuing an application-service-request to said application-server only, if said measure of availability indicates availability of said application-server; and readable code for updating said notification-period depending on the amount of workload of said application-server
either by increasing said notification-period, if said amount of the workload increases,
or by decreasing said notification-period, if said amount of the workload decreases.

17. A computerized method for determining availability according to claim 7, comprising
wherein said measure of availability of the second step indicates unavailability of said application-server, if said difference exceeds said notification-period.

* * * * *